Patented Dec. 3, 1940

2,223,558

UNITED STATES PATENT OFFICE 2,223,558

EMULSION

Albert K. Epstein, Chicago, Ill.

No Drawing. Application March 5, 1938,
Serial No. 194,081

26 Claims. (Cl. 99—123)

My invention relates to the preparation of plastic emulsions of the oleaginous-aqueous type, particularly those wherein the oleaginous material constitutes the continuous or disperse phase of the emulsion.

Emulsions of this type have heretofore been prepared as, for example, many of the salves, ointments, cosmetic creams and products intended for human consumption such as butter substitutes or margarine.

In prior Patents No. 2,052,025 and Reissue No. 19,425, there is disclosed the preparation of plastic emulsions of oleaginous and aqueous materials containing emulsifying or stabilizing agents in the form of aliphatic polyhydroxy substances partially esterified with higher molecular weight aliphatic or fatty acids containing at least six or eight and preferably from twelve to eighteen carbon atoms, as, for example, monoglycerides such as monostearin, polyglycerides with free or unesterified polyglycerol hydroxy groups, and the like.

My present invention is based upon the employment, for the stabilization of plastic emulsions of oleaginous and aqueous materials, of aliphatic polyhydroxy substances partially esterified with higher molecular weight aliphatic or fatty acids derived from polymerized or oxidized oils, such as the well-known blown oils which are described, among other places, in United States Patents Nos. 1,570,529 and 1,603,155. While monoglycerides and diglycerides of polymerized higher molecular weight fatty acids have heretofore been utilized as emulsifying agents for oleaginous-aqueous emulsions, no one, prior to my invention, so far as I am aware, has proposed their use for making plastic emulsions or dispersions such as margarine and the like. My invention has particular utility in connection with the manufacture of margarine where the stabilizing agents, described hereinabove and which will be described hereinafter in greater detail, function not only to stabilize the emulsion but serve to retard or substantially prevent leakage of moisture from or weeping or sweating of the margarine. In view of this fact, it is clear that my invention permits regulation or control of the amount of moisture in margarine and similar plastic emulsions.

As indicated, the stabilizing agents which I employ herein are esters of aliphatic polyhydroxy substances or aliphatic polyhydric alcohols, there being at least one and preferably more than one free or unesterified polyhydroxy or polyhydric hydroxyl group in the molecule. Among the polyhydroxy substances from which the stabilizing agents which I employ herein may be derived may be mentioned the following as illustrative, it being understood that the list is by no means intended to be exhaustive: glycols such as ethylene glycol, propylene glycol, trimethylene glycol, butylene glycol and the like; polyglycols such as diethylene glycol; pentaerythritol; quercitol; polyglycerols such as diglycerol, triglycerol, tetraglycerol and the like including mixtures thereof; carbohydrates or sugars including mono-, di- and polysaccharides such as dextrose, sucrose, xylose, arabinose, galactose, fructose, maltose, mannose, dextrin, starch, and the like; sugar alcohols such as arabitol, mannitol, sorbitol and dulcitol; and polyhydroxy-carboxylic acids such as tartaric acid, mucic acid, saccharic acid, gluconic aid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as, for example:

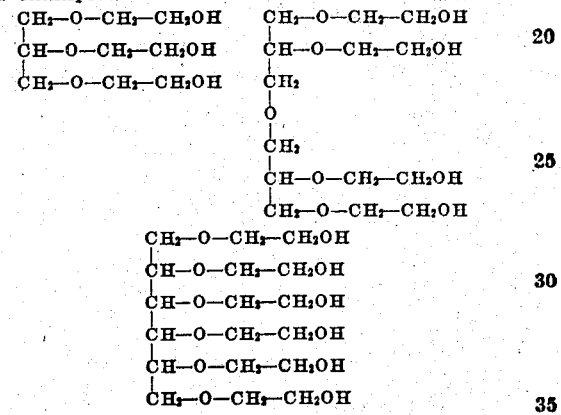

(For convenience, all hydroxyl groups are written facing one way.)

The carboxylic oxidation products of polyglycerols referred to hereinabove may be represented by the formulae:

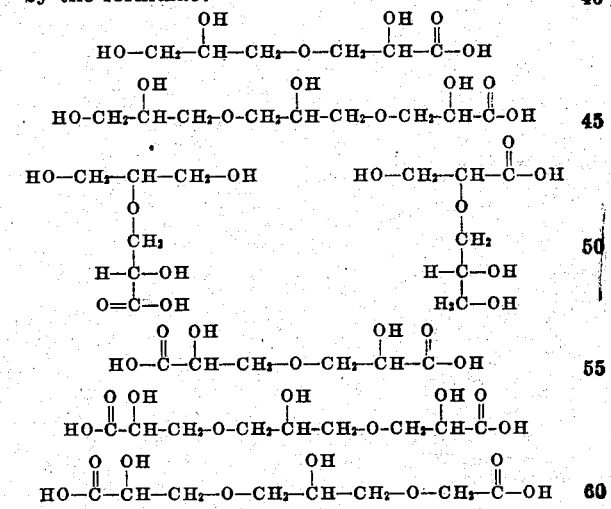

Specific examples of stabilizing agents which I may employ herein and the higher molecular weight aliphatic or fatty acid radicals of which are derived from polymerized or oxidized or blown oils are monoglycerides, diglycerides, polyglycerides with at least one and preferably at least two free or unesterified polyglycerol hydroxy groups, mono-esters of diethylene glycol, sorbitol, mannitol, dextrose, sucrose, mixtures of any two or more thereof, and the like. While fair results are obtainable by the use of monoglycerides, diglycerides and mixtures thereof, I wish to distinguish the same sharply from the polyglyceride derivatives, these latter compounds being markedly superior in their efficacy to the monoglycerides or diglycerides in that they are readily dispersible in aqueous media and, in addition, are excellent anti-spattering agents for margarine and similar emulsions. Accordingly, I make particular claim for such polyglyceride derivatives for my present purposes.

The stabilizing agents are preferably made by re-esterifying a previously prepared polymerized, oxidized or blown oil with glycerol, polyglycerol, or other polyhydroxy substance. Alternatively, the polyhydroxy substance may initially be reacted with a higher fatty acid or a triglyceride oil or fat such as cottonseed oil, corn oil or the like to form higher fatty acid esters of the polyhydroxy substances, which esters contain unesterified hydroxy groups attached to the polyhydroxy nucleus, and the resulting product may then be polymerized, oxidized or blown. In certain instances, this latter procedure produces improved results over the first described method.

In order that those skilled in the art may fully appreciate the full scope of my invention, I shall describe illustrative methods of preparing the stabilizing agents which I may employ herein and I shall then disclose the manner in which said agents may be utilized in accordance with the teachings of my invention.

Example A

Eight pounds of soya bean oil were heated for 2 hours at a temperature between 270 degrees C. and 275 degrees C., air being passed through the body of said oil continuously. The viscosity of the original oil was 18°, measured on a Mac-Michael viscosimeter and the viscosity of the resulting polymerized oil after the treatment described was 42.5°. Measured at 22.5 degrees C., the specific gravity of the original oil was 0.9165 and that of the polymerized oil was 0.9280.

Two pounds of the polymerized oil were mixed with 1.0 pound of glycerine and 0.02 pound NaOH and the mass heated for 2 hours at 250 degrees C. to produce a mixture of mono- and di-esters of glycerine. The resulting product was a viscous mass, soluble in oil, and had good emulsifying properties, particularly for margarine. About 0.3 to 0.5% of said product reduced leakiness of margarine very satisfactorily.

The stabilizing agent produced in this example has very poor anti-spattering properties. It is not soluble in water but will imbibe water.

Example B 880 grams of polymerized soya bean oil, produced as described above, were mixed with 800 grams of polyglycerol having an average molecular weight of about 160, and the mixture was heated for 2 hours at 250 degrees C., with stirring, while passing carbon dioxide gas therethrough. The reaction mass was allowed to cool and the unreacted polyglycerol was removed by settling and drawing off. The final product was a clear oil, viscous, but flowable, dispersible in water to make a milky dispersion, and, when freed of polyglycerol, was soluble in oils.

About 0.5% of said product added to margarine produced good anti-spattering effects. Even as low as 0.25% reduced spattering of margarine to an extent sufficient to make the margarine suitable for frying purposes.

When a polyglycerol of an average molecular weight of 215 or 240 is employed in Example B, as low as 0.1% or less of the reaction product is sufficient to produce good anti-spattering behavior.

The soya bean oil may also be blown with air at lower temperatures, namely, from 100 degrees C. to 120 degrees C., for a length of time sufficient to increase the viscosity substantially, as shown above. The resulting viscous oil may then be steamed by passing steam therethrough while maintaining the oil at a temperature of 260 degrees C. to 300 degrees C. until there is a further substantial increase in viscosity but before the oil gelatinizes. This blown oil may then be re-esterified with glycerine or polyglycerol or the like in the presence of an alkali catalyst such as sodium hydroxide, sodium glycerate, sodium alcoholate or the like to produce mono-, di- or polyglycerides of the oxidized fatty acids or mixtures of said esters. When re-esterifying with glycerine, the latter preferably should be used in excess so as to produce a substantial proportion of the monoglycerides.

An alternative method of preparing the stabilizing agents where both air and steam are passed through the oil as described above comprises initially blowing air into the oil to increase its viscosity, re-esterify the same with polyglycerol or the like, and then blow steam thereinto while maintaining the product at elevated temperatures, for example 260 degrees C. to 300 degrees C., for a time sufficient to increase the viscosity appreciably.

Example C

One hundred pounds of glycerine substantially free of moisture were heated with one pound of sodium hydroxide, the latter acting as a catalyst. The mixture was heated for four and one-half hours at 250 degrees C. to 260 degrees C. in a non-oxidizing atmosphere, produced, for example, by bubbling carbon dioxide or other inert gas through the reaction mixture. Alternatively, an inert atmosphere of hydrogen or carbon dioxide gas may be maintained above the reaction mixture in the vessel. Water present in the glycerol and that formed by the polymerization of the glycerol during the reaction boils off together with a slight amount of glycerol. The resulting product is a mixture of polyglycerols. By heating at a higher temperature and over a longer period of time and by varying other conditions, the degree of polymerization of the glycerol may be increased.

Two hundred pounds of a blown cottonseed oil, produced, for example, in accordance with the disclosure of United States Patent No. 1,570,529, were heated with two hundred pounds of the polyglycerol mixture produced as described above, the mass being heated at approximately 260 degrees C. to 265 degrees C. for about three hours, in the presence of two-tenths of a pound of caustic soda. The reaction was carried out in the presence of an inert gas by bubbling a stream of carbon dioxide through the reaction mass so as to cause a stirring or agitation thereof.

The material was then allowed to cool and the excess of polyglycerol was drawn off.

Example D

Two hundred and fifty pounds of a blown soya bean oil, produced as described in United States Patent No. 1,570,529, were mixed with three hundred pounds of polyglycerols, produced as described above, and one-fourth pound of caustic soda was added thereto. The mass was heated for three hours at about 260 degrees C. in an inert atmosphere, stirring being continuous. After the reaction, the product was cooled and the unreacted polyglycerol was drawn off.

Example E

Four hundred pounds of a blown linseed oil, produced as described in United States Patent No. 1,570,529, were mixed with one hundred pounds of glycerine and with about four-tenths of a pound of sodium hydroxide. The mass was heated and stirred in an inert atmosphere for two hours at a temperature of 250 degrees C. to 260 degrees C. The product was then cooled and the excess or unreacted glycerine was drawn off. The final product contained a mixture of monoglycerides and diglycerides of the fatty acids of the blown oil together with some unreacted triglyceride.

The reaction mixtures described above may be used as such or they may be treated, if desired, to produce the effective esters in substantially pure form.

As I have indicated above, the stabilizing agents may be employed in various kinds of plastic emulsions of oleaginous and aqueous materials. They may be incorporated into the emulsion in various ways. Thus, for example, they may be initially dissolved or dispersed in the oleaginous constituent of the emulsion prior to the production of the emulsion. Again, in certain instances, they may be combined with the oleaginous and aqueous constituents of the emulsion and the entire mass emulsified. Another manner of effecting their incorporation is to form an aqueous paste thereof, as described in United States Patent No. 1,917,254 (Reissue Patent No. 19,245). The exact method selected will depend upon various factors, it being understood that the manner in which incorporation is effected is not critical.

The proportions of the stabilizing agent are subject to relatively wide variation, the amount employed being dependent upon the potency of the particular agent selected, the specific character of the emulsion in which it is utilized, and the particular results desired. In general, from 0.05% to 0.5%, based on the weight of the oleaginous constituent, will be effective for most purposes but I may increase this substantially, using up to several percent. Since, however, good results are obtained when using the smaller percentages, I prefer to do so, particularly in view of economic and other considerations.

The following examples, illustrative of my invention, show how plastic emulsions may be stabilized in accordance with my teachings herein:

Example I

Approximately 800 pounds of cocoanut oil, 150 pounds of so-called hydrogenated cocoanut oil (melting point 110 degrees F.), 50 pounds of peanut oil, and 20 to 25 gallons of cultured milk were emulsified together in a conventional manner and the resulting emulsion was crystallized in accordance with the "dry" method, that is, by congealing the emulsion by contacting the same with a refrigerated metallic surface. The resulting solidified margarine emulsion was tempered and was then introduced into a blender with a previously prepared aqueous paste containing 15 pounds of ripened milk and 15 pounds of the product of Example A. The final margarine product was plastic and substantially devoid of the tendency of moisture to leak therefrom.

Example II

About two pounds of the product of Example B were dissolved or dispersed in a melted mixture of 50 pounds of cottonseed oil, 400 pounds of cocoanut oil (76 degrees C.), and 50 pounds of hydrogenated cocoanut oil (110 degrees F.), and the resulting mixture was churned or emulsified with 10 to 15 gallons of cultured milk. The resulting emulsion was then solidified or congealed by contacting it with the exterior surface of a chilling roll, in accordance with known practice. The solidified emulsion was then rendered smooth and plastic by tempering and kneading in accordance with usual practice. Salt and other flavoring material is preferably incorporated in the kneading stage. The finished margarine had good spreading qualities and was substantially free of the tendency of moisture to leak therefrom.

Example III

A vanishing cream was prepared by incorporating 20 grams of the product of Example C in a cream produced from 400 grams stearic acid, 27 grams potassium hydroxide, 1600 cc. of water and perfume. The cream was made in the usual manner in which such products are made, in the present case the product of Example C being preliminarily incorporated into the stearic acid. A cream of good spreading properties and relatively free of syneresis tendencies resulted.

It will be understood that while the invention has been described in some detail the disclosure is to be taken as illustrative and in no way limitative of the true scope of my invention. The stabilizing agents which I have described herein may be employed either as such or together with supplementary agents such as lecithin and other anti-spattering or anti-weeping agents as disclosed, for example, in United States Patents Nos. 1,917,253 and 1,917,256. The margarines produced in accordance with my invention may be utilized as a spread for bread or the like or may be utilized for baking purposes in the same way that ordinary shortenings such as butter and margarine are employed.

The potency of the fatty acid mono- and diglycerides of the blown or polymerized oils may be enhanced by the addition thereto of a proportion, for example 10% to 50% or more thereof, of the polyglyceride esters produced from the blown oils as described above. This brings about an enhancement of the emulsifying properties of the glycerine esters so that a smaller proportion may be used to effect a given result and it also aids in dispersing the stabilizing material in the emulsion. In this manner, the surface modifying function of the stabilizing agents is increased. By re-esterifying the blown or polymerized oils with polyglycerols, mixtures of mono-, di- and polyglycerides are produced having the enhanced surface modifying action described.

The term "higher," as used herein and in the claims to describe carboxylic and fatty acids and the like, will be understood to mean at least six carbon atoms, unless otherwise specifically stated.

What I claim as new and desire to protect by Letters Patent of the United States is:

1. Plastic emulsions of oleaginous and aqueous materials containing a proportion of a stabilizing agent in the form of an aliphatic polyhydroxy substance incompletely esterified with a higher molecular weight aliphatic acid derived from the group consisting of polymerized and oxidized higher molecular weight aliphatic acids.

2. Plastic emulsions of oleaginous and aqueous materials, the oleaginous material constituting the continuous phase of the emulsions, containing a proportion of a stabilizing agent in the form of an aliphatic polyhydroxy substance incompletely esterified with a higher molecular weight fatty acid derived from the group consisting of polymerized and oxidized higher molecular weight fatty acids.

3. Plastic emulsions of oleaginous and aqueous materials, the oleaginous material constituting the continuous phase of the emulsions, containing a proportion of a stabilizing agent in the form of an aliphatic polyhydroxy substance incompletely esterified with a higher molecular weight fatty acid derived from an oxidized triglyceride.

4. Plastic emulsions of oleaginous and aqueous materials, the oleaginous material constituting the continuous phase of the emulsions, containing a proportion of a stabilizing agent in the form of polyglycerol incompletely esterified with a higher molecular weight fatty acid derived from an oxidized triglyceride.

5. Margarine in the form of a plastic emulsion of oleaginous and aqueous materials, the oleaginous material constituting the continuous phase, containing a proportion of an aliphatic polyhydroxy substance incompletely esterified with a higher molecular weight fatty acid derived from the group consisting of polymerized and oxidized higher molecular weight fatty acids.

6. Margarine in the form of a plastic emulsion of oleaginous and aqueous materials, the oleaginous material constituting the continuous phase, containing a proportion of an aliphatic polyhydroxy substance incompletely esterified with a higher molecular weight fatty acid derived from an oxidized triglyceride.

7. Margarine in the form of a plastic emulsion of oleaginous and aqueous materials, the oleaginous material constituting the continuous phase, containing a proportion of a member selected from the group consisting of higher molecular weight fatty acid monoglycerides, higher molecular weight fatty acid diglycerides, and mixtures thereof, the higher fatty acid radical of which is derived from an oxidized triglyceride.

8. The product of claim 1 wherein the stabilizing agent comprises from about .05% to 0.5%, by weight, of the oleaginous material.

9. Margarine in the form of a plastic emulsion of oleaginous and aqueous materials, the oleaginous material constituting the continuous phase, containing a proportion of a stabilizing agent in the form of polyglycerol incompletely esterified with a higher molecular weight fatty acid derived from an oxidized triglyceride.

10. Plastic emulsions of oleaginous and aqueous materials containing a proportion of a mixture of stabilizing agents in the form of glycerol and polyglycerol each incompletely esterified with a higher molecular weight fatty acid derived from an oxidized oil.

11. Margarine in the form of a plastic emulsion of oleaginous and aqueous materials, the oleaginous material constituting the continuous phase, containing a proportion of a mixture of stabilizing agents including glycerol and polyglycerol each incompletely esterified with a higher molecular weight fatty acid derived from a polymerized triglyceride.

12. Margarine in the form of a plastic emulsion of oleaginous and aqueous materials, the oleaginous material constituting the continuous phase, containing a proportion of the reaction product resulting from the re-esterification of polyglycerol with a polymerized triglyceride.

13. Emulsifying agents comprising a mixture of glycerol and polyglycerol each incompletely esterified with a higher molecular weight fatty acid derived from polymerized oils.

14. Emulsifying agents comprising reaction mixtures in the form of re-esterification reaction products of polymerized triglycerides and polyglycerols.

15. Emulsifying agents in accordance with claim 14 wherein the triglyceride is soya bean oil.

16. Plastic dispersion containing a continuous phase consisting of edible fatty acid glyceride and a disperse phase consisting of aqueous liquid and having included therein an ester of a polyhydric alcohol compound and higher fatty acid, said ester having at least one unsubstituted hydroxyl group of the alcohol compound and at least one oxidised fatty acid radicle.

17. Plastic dispersion containing a continuous phase consisting of edible fatty acid glyceride and a disperse phase consisting of aqueous liquid and having included therein an ester of a polyhydric alcohol compound and higher fatty acid, said ester having at least one unsubstituted hydroxyl group of the alcohol compound and at least one polymerised and oxidised fatty acid radicle.

18. Plastic dispersion containing a continuous phase consisting of edible fatty acid glyceride and a disperse phase consisting of aqueous liquid and having included therein an ester of glycerol and higher fatty acid, said ester having at least one unsubstituted hydroxyl group of the glycerol and at least one polymerised and oxidised fatty acid.

19. Plastic dispersion containing a continuous phase consisting of edible fatty acid glyceride and a disperse phase consisting of aqueous liquid and having included therein an ester of glycerol and polymerised and oxidised higher fatty acid, said ester having at least one unsubstituted hydroxy group of the glycerol.

20. Plastic dispersion containing a continuous phase consisting of edible fatty acid glyceride and a disperse phase consisting of aqueous liquid and having included therein an ester of a polyhydric alcohol compound, obtained by condensation of polyhydric alcohol, and higher fatty acid, said ester having at least one unsubstituted hydroxyl group of the alcohol compound and at least one polymerised and oxidised fatty acid radicle.

21. Plastic dispersion containing a continuous phase consisting of edible fatty acid glyceride and a disperse phase consisting of aqueous liquid and having included therein an ester of a polyhydric alcohol compound, obtained by polymerisation of polyhydric alcohol, and higher fatty acid, said ester having at least one unsubstituted hydroxyl group of the alcohol compound and at least one polymerised and oxidised fatty acid radicle.

22. Plastic dispersion containing a continuous phase consisting of edible fatty acid glyceride and a disperse phase consisting of aqueous liquid and having included therein an ester of a polyglycerol and higher fatty acid, said ester having at least one unsubstituted hydroxyl group of the polyglycerol and at least one polymerised and oxidized fatty acid radicle.

23. Plastic dispersion containing a continuous phase consisting of edible fatty acid glyceride and a disperse phase consisting of sour milk and having included therein an ester of a polyhydric alcohol compound and higher fatty acid, said ester having at least one unsubstituted hydroxyl group of the alcohol compound and at least one polymerised and oxidised fatty acid radicle.

24. A margarine containing edible fatty acid glyceride as the continuous phase and aqueous liquid as the disperse phase and having included therein an ester of a polyhydric alcohol compound and higher fatty acid, said ester having at least one unsubstituted hydroxyl group of the alcohol compound and at least one polymerised and oxidised fatty acid radicle.

25. A margarine containing edible fatty acid glyceride as the continuous phase and sour milk as the disperse phase and having included therein an ester of a polyhydric alcohol compound and higher fatty acid, said ester having at least one unsubstituted hydroxyl group of the alcohol compound and at least one polymerised and oxidised fatty acid radicle.

26. Plastic dispersion containing a continuous phase consisting of edible fatty acid glyceride and a disperse phase consisting of aqueous liquid and having included in the continuous phase an ester of a polyhydric alcohol compound and higher fatty acid, said ester having at least one unsubstituted hydroxyl group of the alcohol compound and at least one polymerised and oxidised fatty acid radicle.

ALBERT K. EPSTEIN.